United States Patent [19]

Harrell, Jr.

[11] Patent Number: 5,183,100

[45] Date of Patent: Feb. 2, 1993

[54] SYSTEM FOR EFFICIENTLY EXCHANGING HEAT OR COOLING GROUND WATER IN A DEEP WELL

[76] Inventor: James E. Harrell, Jr., P.O. Box 235, Wayne, Pa. 19087

[21] Appl. No.: 655,133

[22] Filed: Feb. 14, 1991

[51] Int. Cl.⁵ .................................................. F24J 3/08
[52] U.S. Cl. ..................... 165/45; 60/641.2; 62/260; 62/238.7
[58] Field of Search ............... 165/45; 60/641.2; 62/260, 238.6, 238.7

[56] References Cited

U.S. PATENT DOCUMENTS

| | | | |
|---|---|---|---|
| 2,461,449 | 2/1949 | Smith et al. | 165/45 |
| 4,448,237 | 5/1984 | Riley | 165/45 |
| 4,483,318 | 11/1984 | Margen | 165/45 |

FOREIGN PATENT DOCUMENTS

| | | | |
|---|---|---|---|
| 3022588 | 12/1981 | Fed. Rep. of Germany | 165/45 |
| 3994 | 9/1985 | World Int. Prop. O. | 165/45 |
| 707 | 1/1990 | World Int. Prop. O. | 165/45 |

Primary Examiner—Albert W. Davis, Jr.
Attorney, Agent, or Firm—John B. Sowell

[57] ABSTRACT

A novel ground water heat transfer system is provided for low cost and high efficiency heat pumps and includes a deep well filled with water. An insulating sleeve which is smaller than the diameter of the deep well is placed in the center of the deep well so as to separate the well water into two portions. A water pump is suspended preferably below the water level and pumps the water from inside the insulating sleeve to the space between the insulating sleeve and the wall of the deep well in a manner which eliminates the dynamic lifting head. In an open loop system the water from the pump is first pumped to an heat exchanger and returned to the space between the insulating sleeve and the wall of the deep well. In a closed loop system the water from the water pump is pumped directly into the space between the insulating sleeve and the wall of the deep well and the fluid supplied the heat pump is pumped through a closed loop which is submersed in the space between the insulating sleeve and the wall of the deep well.

17 Claims, 5 Drawing Sheets

SYSTEM FOR EFFICIENTLY EXCHANGING HEAT OR COOLING GROUND WATER IN A DEEP WELL

BACKGROUND OF THE INVENTION

1. Field of the Invention

The present invention relates to high efficiency ground water heat transfer systems for heat pumps. More particularly, the present inventions heat transfer system may be used for heating or cooling in open loop or closed loop heat exchange systems.

2. Description of the Prior Art

Heretofore ground water heat transfer systems have been described extensively in publications and patents. Critical data for designing such systems are found in a publication entitled, "Ground Water Applications Manual" by Mammouth Corp. (A Nortech Company) of Holland, Mich. Prior art heat transfer systems are classified in the U.S. Patent Office in Class 165, Sub-Class 45 and in International Class F25D 23/12.

As will be described in more detail hereinafter, most open loop systems that incorporate economical shallow well pumps have not been able to obtain the maximum heat transfer between the sides of the well and the circulating water.

More expensive and complex closed loop systems have been designed which incorporates condensors or heat exchangers that are installed in the well below the water level. These systems achieve very good heat exchange efficiency but have failed to obtain the maximum heat transfer between the deep well water and the sides of the deep well.

U.S. Pat. No. 4,741,389 shows and describes a closed loop system which was an improvement of the commonly known horizontal closed loop systems first built in the late sixties in this country. Such horizontal loops comprised copper pipe buried below the frost line to obtain earth heat exchange for heating and cooling.

U.S. Pat. No. 4,741,389 improves on this system by employing the same type of closed loop but installs the heat exchange pipes in a vertical direction to obtain heating or cooling between the earth at a more stabilized well water temperature in a shallow well configuration.

U.S. Pat. No. 4,448,237 shows and describes an open loop system wherein the source of heating and cooling supply water is always taken fresh from a unlimited supply and is not recirculated back into the same well or portions of the same well.

U.S. Pat. No. 4,536,101 shows and describes a novel in-the-well heat exchanger for use with a refrigerant or circulating fluid. Heat exchangers are more economically located at or with the heat pump at the building being heated or cooled and their efficiency is a function of the temperature of the circulating cooling/heating fluid.

Heretofore, designers of ground water heat transfer systems failed to provide an economical system which would permit the maximum heat transfer between the sides of a deep well and the water in the deep well.

SUMMARY OF THE INVENTION

It is a primary object of the present invention to provide a novel ground water heat transfer system for a deep well that promotes a high efficiency of heat transfer between the water and the sides of the well.

It is another principal object of the present invention to provide a high efficiency ground water heat transfer system for use with open loop systems or closed loop systems.

It is another principal object of the present invention to provide an economical and easily accessible ground water heat transfer system for a deep well which promotes high heat exchange transfer between the well water and the well wall.

It is another principal object of the present invention to provide a novel heat transfer system having a deep well in which is inserted a coaxial insulating separator liner for partitioning the wet well into supply and return coaxial sections.

It is another principal object of the present invention to provide a novel heat transfer system that takes advantage of the newly developed technology for economically drilling deep wells through all types of material.

It is another principal object of the present invention to provide an extremely simple and economical heat transfer system for deep wells for ground water heat transfer systems.

It is another principal object of the present invention to provide a novel heat transfer system which may be employed with open loop systems, closed loop systems and systems employing heat transfer heat exchangers in the well.

According to these and other objects of the present invention, there is provided a novel heat transfer system for low cost, high efficiency heat pump system. The heat transfer system comprises a deep well filled with water to the static water level and having a conventional casing down to bedrock to prevent ground water contamination with the well water. A concentric insulating sleeve is extended from the bottom of the deep well to a distance above the water level in the deep well. A water pump is suspended inside of the concentric insulating sleeve for pumping water to the heat pump having a heat exchanger or condenser located in a building to be heated or cooled. A return pipe from the heat exchanger/condenser returns the water to the well at approximately the same elevation point, thereby eliminating the lifting head. The return water is discharged into the annular space between the insulating sleeve and the well wall so as to sweep the well wall and create a high coefficient of heat transfer between the deep well water and the well wall.

DESCRIPTION OF THE PREFERRED EMBODIMENT

Figure 1:
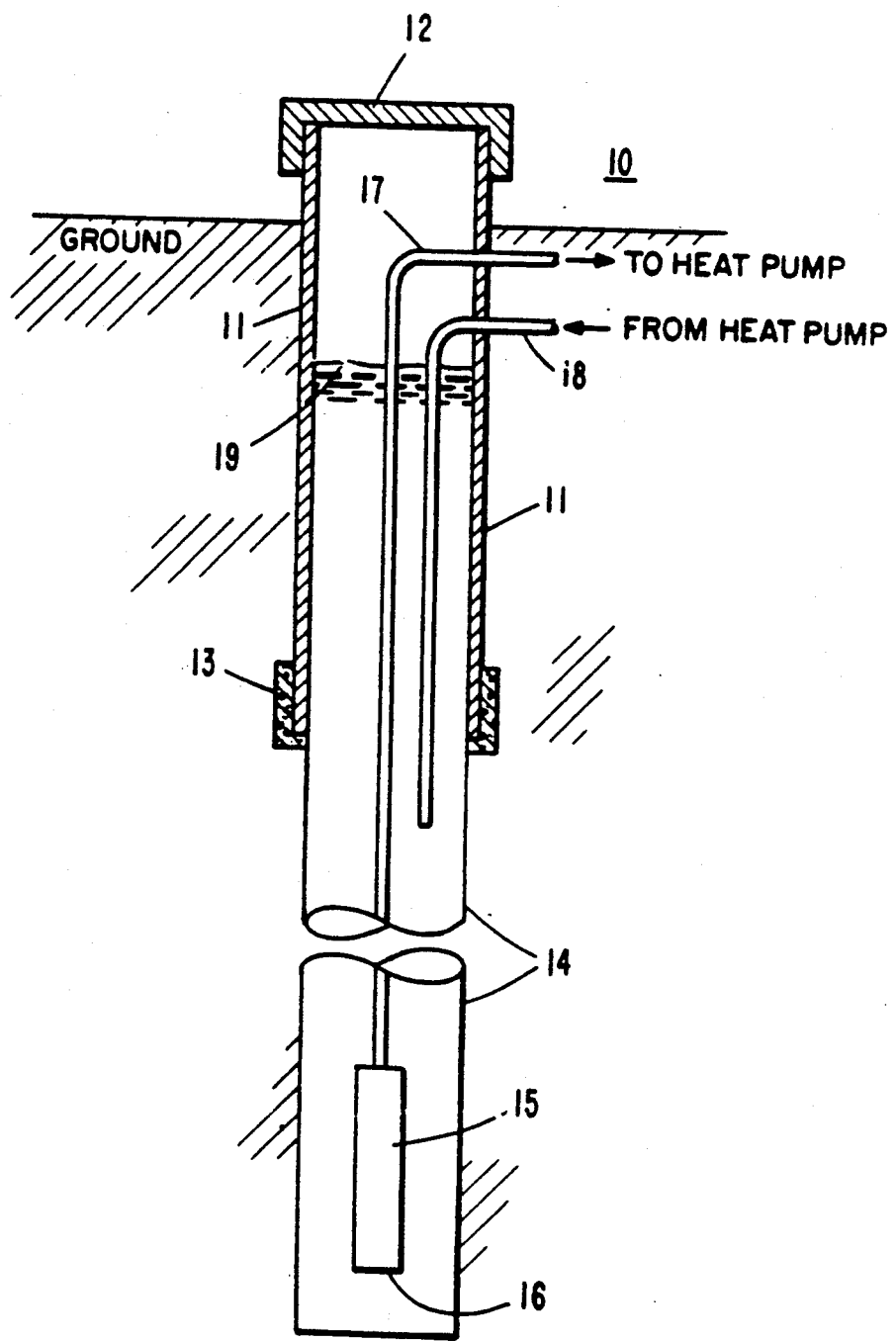
FIG. 1 is a simplified schematic drawing in cross-section showing a typical prior art open loop shallow well ground water heat transfer system.

Heretofore open loop ground water systems were expensive and notoriously inefficient. They were only used where an adequate water well supply was available with sufficient capacity. Refer now to FIG. 1 showing a simplified schematic drawing of a typical prior art open loop shallow well ground water heat transfer system. The well system 10 comprises a well casing 11 which is capped with a cap 12 at the top and grouted to form a casing seal 13 at bedrock. The imperforate casing 11 is designed to prevent ground water from entering the wet well and contaminating the water therein. The sides of the well 14 which extend below bedrock comprise tightly compressed stabilized ground that does not require a casing therein but are known to drop sediment in the bottom of the well.

In the open loop system 10, a submersible pump 15 is located in the bottom of the well where the sediment would ordinarily accumulate and thus must be suspended from the bottom at the inlet 16. The outlet of pump 15 is connected to a supply pipe 17 which connects to the heat exchanger in the heat pump. The return line or pipe 18 from the heat pump is commonly discharged in a drop pipe below the static water level 19. In this system the return water from the heat pump in line 18 is being supplied to the water at the top of the well. The pump inlet 16 is at the bottom of the well, but there is no assurance that the water will circulate uniformly from the top to the bottom of the well. In order to access the submersible pump at the bottom of the well, it is necessary to pull the supply pipe 17 and return pipe 18 loose from their connections (not shown) at the casing wall. Such connections are commonly referred to as pitless adapters and are commercially available, thus will not be explained herein other than to mention that the pipe inside of the casing is easily disconnected from the pipe on the outside of the casing. Such systems commonly employ PVC pipe for the supply 17 and return 18.

Figure 2:
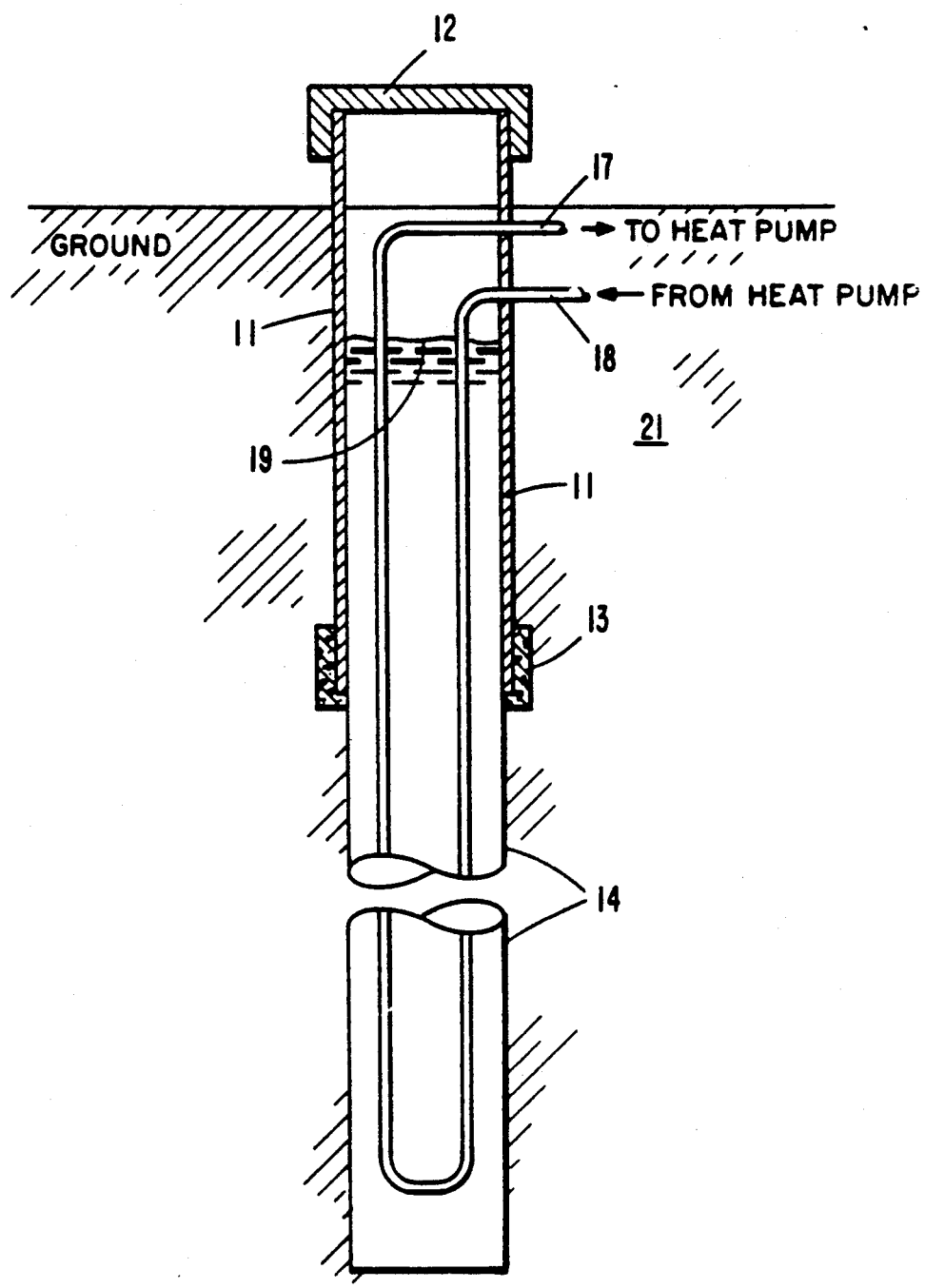
FIG. 2 is a simplified schematic drawing in cross-section showing the FIG. 1 prior art shallow well ground water heat transfer systems adapted for a closed loop system.

Refer now to FIG. 2 which is a simplified schematic drawing and cross-section showing a prior art type shallow well ground water heat transfer system 21 wherein the supply and return pipes 17 and 18 are interconnected to form a closed loop in the well. The other components of the well system 21 are the same a those described herein before with reference to FIG. 1 and are numbered the same. It will be noted that the system 21 must transfer heat through the pipes 17 and 18 into a well water environment which is static or stationary. Further, the pipe most commonly used for the pipes 17 and 18 is polyethylene which is commercially available in long rolls up to 500 or 600 feet whereas PVC is only available in short extruded rigid sections. The problem here is that polyethylene is a better conductor than many other commercially available extruded plastics. This system and the FIG. 1 system are incapable of creating a high coefficient of heat transfer at the wall.

Figure 3:
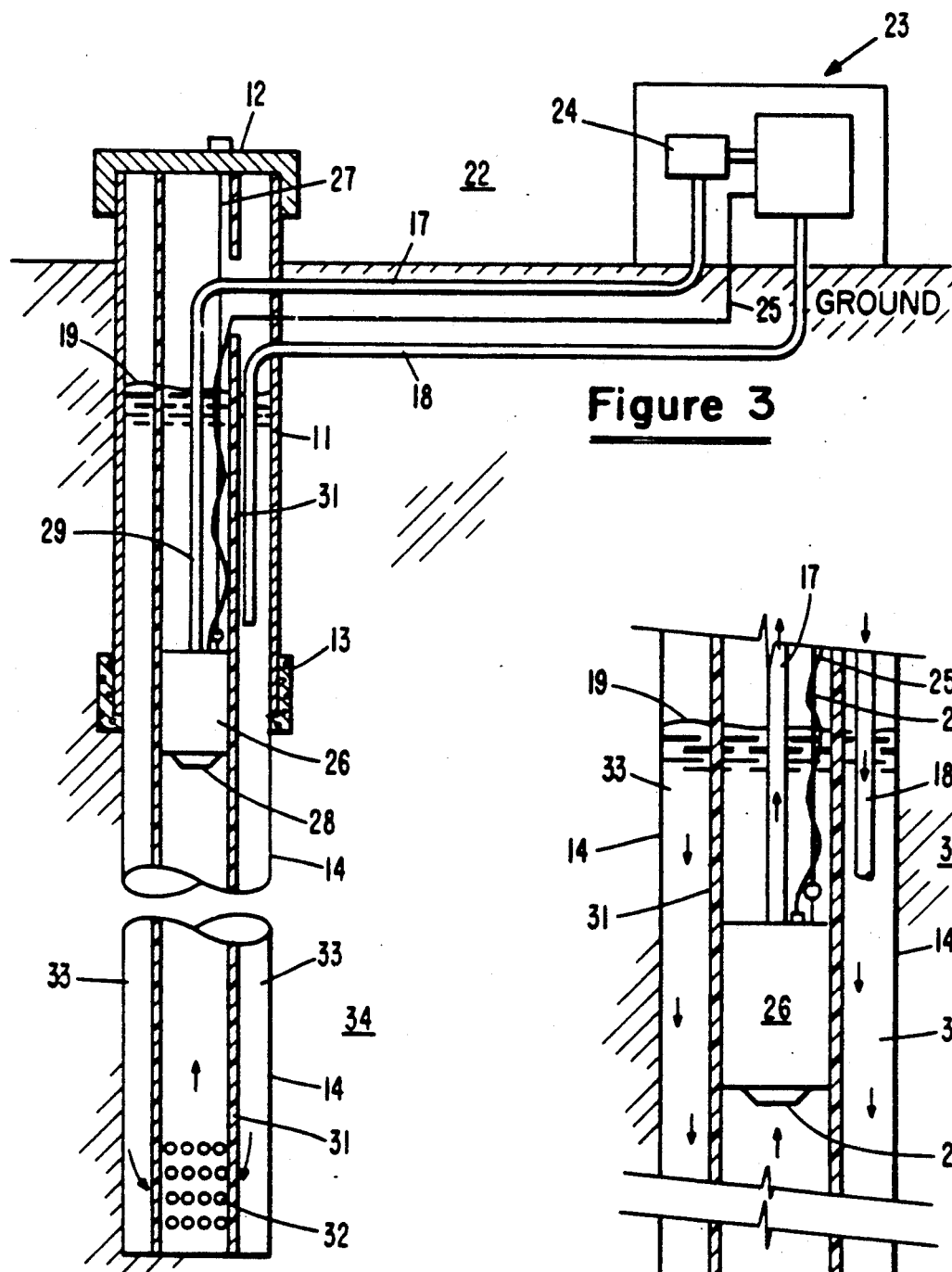
FIG. 3 is a simplified schematic drawing in cross-section of the preferred embodiment of the present invention showing a high efficiency open loop deep well ground water heat transfer system.

Refer now to FIG. 3 which is a simplified schematic drawing in cross section of the preferred embodiment of the present invention. The high efficiency open loop deep well ground water heat transfer system 22 comprises a main upper casing structure 11 a used in FIGS. 1 and 2 and preferably includes pitless adapters in the casing 11 at the supply and return pipes 17 and 18. The water source heat pump 23 preferably includes a separator trap or filter 24 and has provision for a electrical line 25 which is connected to the pump 26 in the well. A steel cable 27 used for supporting the pump 26 also provides a lead or conduit for the electrical connection 25.

Pump 26 is preferably a submersible pump which has an inlet 28 at the bottom and an outlet 29 which connects to the supply pipe 17. The pump 26 may be fixed or loosely suspended inside of an insulating sleeve 31. The insulating sleeve is preferably made from an extruded insulating plastic such as polyethylene, polypropylene and polybutylene or other known insulating plastics. When the plastic material used is known as a good heat conductor, it is preferable to use an expanded or foam thick wall insulating plastic pipe that has a specific gravity slightly less than water so that the insulating sleeve 31 floats in water.

While the pump 26 is preferably shown as a submersible pump below the water level 19, it is possible to suspend the pump 26 above the water level 19 and provide an inlet connection which extends into the water. Similarly it would be possible to provide a mechanical pump above the water level 19 and provide the impeller below the water level driven by the pump supported above the water level. Thus, it will be understood that the location of the pump 26 above or below the water level is not critical as long as there is a positive circulation of the Water inside of the insulating sleeve 31.

Figure 4:
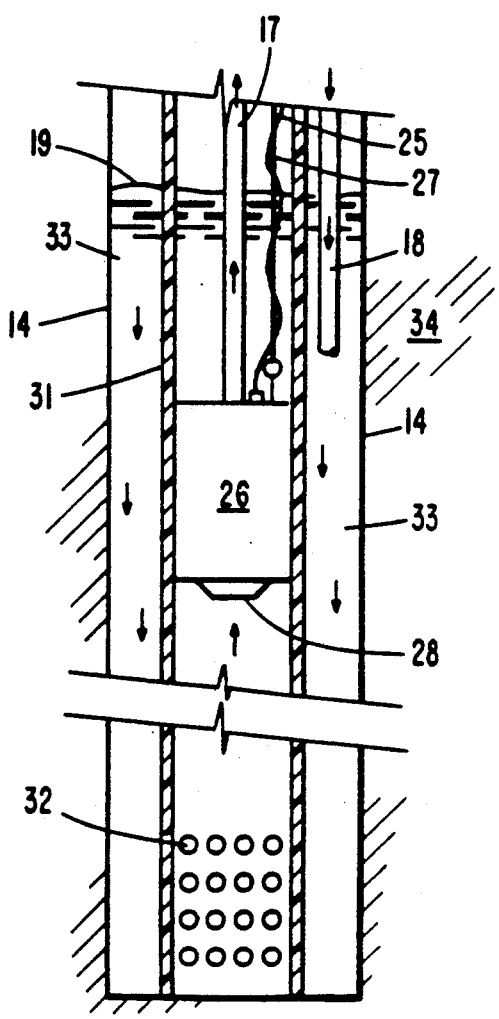
FIG. 4 is an enlarged detail of the pump and water level section of the open loop system of FIG. 3.

Refer now to FIG. 4 showing in enlarged detail the section of the system 22 which incorporates the pump and the bottom of the insulating sleeve 31. The supply pipe 17 is shown conducting Water from the pump 26 to the heat pump 23 shown in FIG. 3. The return pipe 18 from the heat pump 23 is shown extending below the water level 19 so that water is supplied to the annular area between the wall 14 and the sleeve 31. Since the sleeve 31 is imperforate, the water from pipe 18 is forced to the bottom of the well where it is conducted through apertures 32 in the last several feet of the bottom section of the sleeve 31. Water that enters into the inside of sleeve 31 is drawn into the inlet 28 of the pump 26 and supplied to the heat pump 23 and returned via pipe 18 into the annular area 33. Since the supply and return pipes 17 and 18 are the same level, there is no lift head required of the motor 26. Thus, it is possible to pump a sufficient amount of water into the annular area 33 so as to cause a high enough flow rate to assure that the flow of water at the well wall 14 is preferably not laminar but turbulent enough to increase the heat transfer coefficient at the wall 14 by at least 50% over the laminar flow coefficients. It is possible to increase the flow rate so that the heat transfer coefficient is doubled. This is not necessary when the well is deep enough and the transfer coefficient of the ground material 34 has a high coefficient of heat transfer when wet. As will be explained hereinafter, the transfer coefficient for granite is approximately 2 BTUs per hour per square foot per degree Fahrenheit for each linear foot of thickness. This coefficient is substantially higher than gravel and stationary water as will be explained hereinafter. However, it will be noted that the transfer coefficient at the wall 14 can be substantially enhanced by increasing the positive water flow along the wall 14 employing the pump 26 as merely a positive action circulating pump which has no lifting head.

Figure 5:
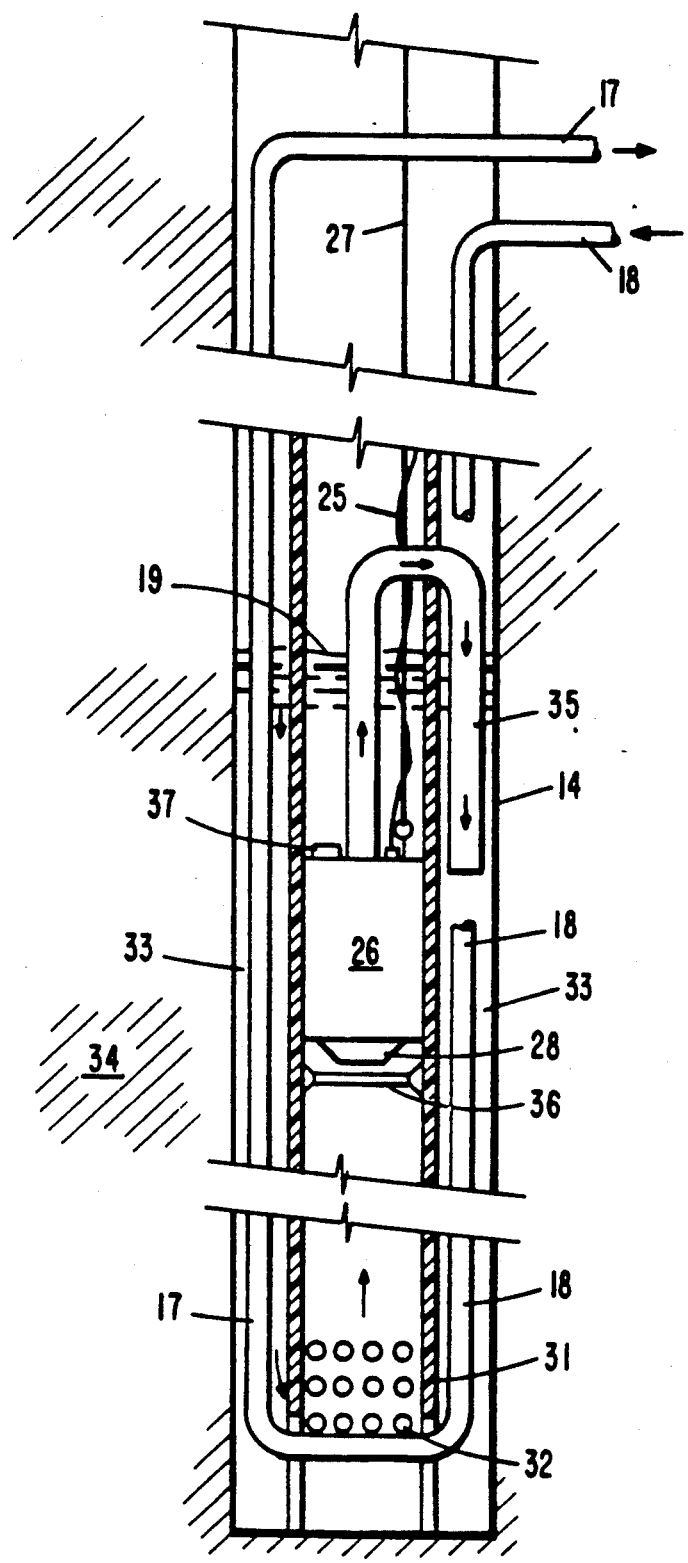
FIG. 5 is an enlarged detail and cross-section showing the preferred embodiment of FIGS. 3 and 4 modified to provide a closed loop system that permits the use of a high coefficient of thermal heat transfer anti-freeze solution.

Refer now to FIG. 5 showing an enlarged detail and cross-section of the preferred embodiment of FIG. 4 which is modified to provide a closed loop system that permits the use of a high coefficient of thermal heat transfer antifreeze solution in the closed loop. For purposes of this invention, the supply pipe 17 is physically connected to the return pipe 18 in a closed loop fashion as explained in FIG. 2. However, in this preferred embodiment, the pipe 17 and 18 is preferably made of a high coefficient of heat transfer material such as copper or high thermal conductivity plastics. In this way all of the heat from the heat pump 23 will be absorbed in the water in the annular area 33. Closed loop systems are preferably used when an antifreeze solution or high thermal coefficient or heat conductivity fluid is desired for the heat pump system. In order to achieve the high coefficient of heat transfer at the wall 14, it is only necessary to use the same pump system as described hereinbefore with reference to FIGS. 3 and 4. Water entering inlet 28 is now pumped to an outlet pipe 35 where it is immediately exhausted into the annular area 33 to achieve the same pumping action explained with reference to FIGS. 3 and 4. A safety screen 36 is shown installed in the insulating sleeve 31 to prevent the pump 26 from being lost in the bottom of the well or being improperly positioned. Anode material 37 may be attached to the pump 26 to neutralize the galvanic corrosion of the water in the well. Since the same water is used over and over, the anode material stabilizes the water which remains at a neutral condition. The electric line 25 and the safety cable 27 may be incorporated together in a single entwined conduit.

While the supply 17 and return 18 are shown diametrically opposite each other in the concentric area 33, it will be understood that these pipes do not need to be 180° transposed from each other. Thus, the diameter of the pipes and the insulating sleeve 31 may be greater than the inside diameter of the well 14. It will be noted that water supplied by pipe 35 cannot stratify but must circulate to the bottom of the well and return through apertures 32 in the aperatured section of the sleeve 31 in the bottom of the well.

Figure 6:
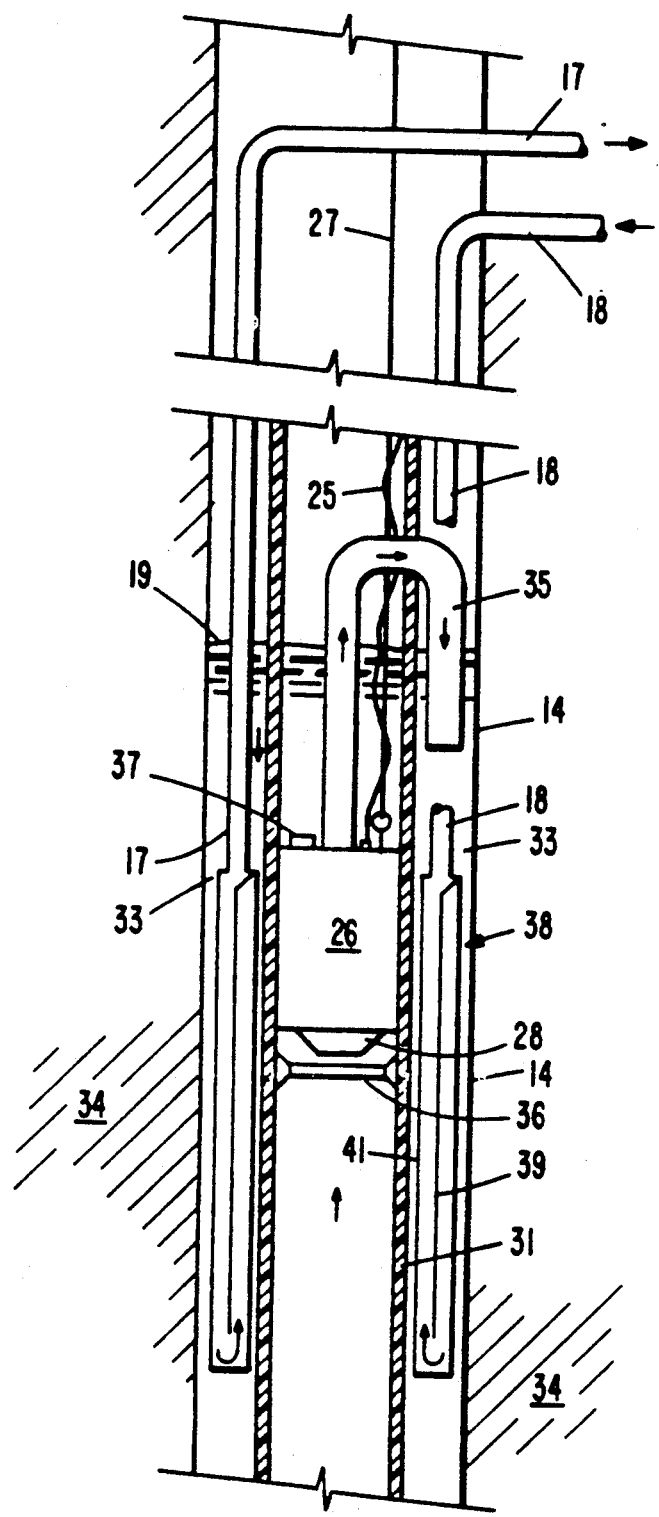
FIG. 6 is an enlarged detail in cross-section showing the preferred embodiment systems modified for use with an in-the-wet-well heat exchanger for use with a closed system of the type shown in FIGS. 3 to 5.

Refer now to FIG. 6 which is an enlarged detail in cross-section of the same are of the closed-loop system shown in FIG. 5. In this modified embodiment, there is provided an annular elongated cylindrical shaped heat exchanger 38 which is installed in the well below the water level and preferably has a single supply and return pipe 17, 18 connected thereto. A cylindrical shaped baffle 39 is shown inside the heat exchanger 38 which forces the water from the return pipe 18 along the outer portion of the heat exchanger to the bottom of the heat exchanger where it is turned around and now must contact the inner surface 41 of the heat exchanger in its return path to the supply pipe 17. Heat exchangers of this type are easily constructed from tubes which are seam welded together and arranged to have manifolds or baffles at their bottom and top so as to direct the flow of fluid. Such heat exchangers are commonly made from highly conductive material such as copper and are employed in systems where highly conductive heat exchange fluids such as freon and ethylene glycol are to be employed. In order to achieve the high coefficient of heat transfer between the well water and the wall 14, it is only necessary to install the FIG. 5 pump configuration so as to assure the turbulent flow of water against the outside wall in the annular area 33.

Having explained a preferred embodiment of the present invention in an open system, it will be understood that closed systems may be used when environmental conditions are encountered that demand such systems. However, closed systems are more expensive than the open systems explained hereinbefore. Moreover, the closed systems are less efficient because they incorporate an added film or wall of heat transfer between the earth temperature water and the heat pump. In the design of the present systems, it is preferable to have complete knowledge of the ground material 34 which can be obtained during the drilling operation and this will determine the depth or lack of depth that is necessary to support the heat pump system. Having once established the ground material 34 and its heat transfer condition using the present high efficient heat transfer wall condition, the well may be drilled rapidly and economically to cover the tonnage of the heat pump required. Heretofore a rule of thumb was used wherein 100 to 150 feet of 6" well was required for the most efficient heat systems known. Since the wall condition and the heat transfer condition was not heretofore optimized, it is apparent that the present system can support a higher tonnage heat pump system than systems known in the prior art using the identical well depth.

Refer now to Table 1 showing the thermal conductivity (K) for a number of different materials that are used in the heat pump system and ground materials which are encountered with deep well systems. It will be noted that the thermal conductivity K is published in well known authoritative publications in terms of BTU/hr/sq. ft./degree Fahrenheit/foot of transmission thickness. These coefficients do not include the convective coefficient of heat transfer at the surface of the wall 14. The coefficients $C_f$ for flowing water varies from $C_f = 80$ to $C_f = 615$ as the flow varies from laminar to turbulent. Thus, it can be seen the present invention system which employs an induced turbulent flow of water at the wall 14 is substantially more efficient than the prior art systems explained with reference to FIGS. 1 and 2 hereinbefore.

Having explained a preferred embodiment of the present invention for use with open loop and closed loop systems, it will now be appreciated that the circulating pump 26 is always installed in a manner where there is no differential lifting head. Further it will be understood that the relative diameter of the insulating sleeve and the wall 14 of the well may be varied so as to create an annular area 33 which is smaller than the area inside of the insulating sleeve 31 so as to further enhance turbulent flow. A feature of the present invention includes the fact that the pump 26 only needs to be below the static water level 19 sufficient to assure a wet pumping head or flooded inlet 28. In high efficiency systems, according to the present invention, the pump 26 may be placed 10 to 20 feet below the static water level 19 to prevent cavitation.

A feature of the present invention is that the complete pump system is accessible at the top of the well once the cap 12 is removed. In some prior art system, the submersible pump is placed at the bottom of the well and may ingest abrasive material from the sides of the well 14. In the present invention system the pump is placed high in the well and most of the abrasive material is heavy enough to settle out in the bottom of the well before the water reaches the inlet 28. To assure that the light abrasive material is not recirculated back into the system, the filter or trap 24 is preferably installed at the heat pump 23.

When all of the features are summarized in the present invention, it is seen that the ground water heat transfer system is more efficient in operation, is cheaper to install, is cheaper and easier to maintain and operates at higher thermal efficiency than those systems known heretofore in the prior art. Reversal of the flow in inlet and return pipes should not affect the efficiency.

The present system does not require a large amount of power to develop turbulent flow at the rough wall 14 which promotes turbulent flow. There is substantially no differential head between the annular area 33 and the center area of the insulating sleeve 31. The smooth wall insulating sleeve 31 prevents most counter flow heat exchange when heating or cooling and promotes laminar flow at the surface, thus laminar flow at the sleeve wall can be present with turbulent flow at the well wall.

An ideal efficient deep well heat transfer system would be one in which the well water temperature remained unaffected by heating or cooling being performed at the heat pump. While the present system is not perfect, it is able to transmit enough heat through the well wall 14 to permit only a small change of approximately 2 degrees Fahrenheit. A test system has shown that depending on the ground material 34 the stabilized temperature in the well can easily be maintained under 5 degrees Fahrenheit, thus, the commercially available heat pumps may now be employed all year round with smaller performance penalties than were heretofore obtainable. Greater capacity can be achieved with larger differential temperatures.

TABLE 1

| MATERIAL | THERMAL CONDUCTIVITY (K) (K) in BTU/hr/sq. ft./°F./Ft. Tk. |
|---|---|
| Stationary Air | .015 |
| Foamed PVC | .033 |
| PVC | .101 |
| Sand | .188 |
| Gravel | .220 |
| Polyethylene | .266 |
| Stationary Water | .34 |
| Wet topsoil | .62 |
| Firebrick | .70 |
| Limestone | .75 to 1.751 |
| Sandstone | 1.06 to 3.1 |
| Granite | 2.0 |
| Steel | 36.0 |
| Cooper | 220 |
| Flowing Water film Coefficient *(Cf) | |

*Cf varies from 80 to 615/hr/sq.ft./°F. in going from laminar to turbulent flow.

What is claimed is:
1. A ground water heat transfer system for a low cost high efficiency heat pump, comprising:
   a deep well substantially filled with water having a wet open ground wall extending over the major portion of the well depth,
   a concentric insulating sleeve extending from the bottom of said deep well to a distance above the water level positioned in the center of said water filled deep well for dividing the water in the well into two areas,
   said insulating sleeve defining an open annular water path in the space between the outside of said insulating sleeve and said ground wall,
   a water pump suspended in the top of said well having inlet means extending below said water level in said insulating sleeve, and
   a return pipe connected to said water pump and having an open return outlet for discharging the water near the pump level in the top of the well in the space between said insulating sleeve and the ground wall surface of said deep well, whereby water returned to said space flows to the bottom of said deep well and into the bottom of said insulating sleeve so that the dynamic lift head of said water pump is negligible.

2. A ground water heat transfer system as set forth in claim 1 wherein said water pump inlet means and said water pump are both suspended below the water level in said insulating sleeve.

3. A ground water heat transfer system as set forth in claim 1 wherein the motor of said water pump is suspended above the water level in said insulating sleeve and said water pump inlet means are suspended below the water level.

4. A ground water heat transfer system as set forth in claim 1 wherein the return water flow in said space between said insulating sleeve and the wall surface of said well is turbulent at the wall surface.

5. A ground water heat transfer system as set forth in claim 1 wherein said insulating sleeve is provided with aperture means connecting the water in said space between the sleeve and the wall surface with the water inside said insulating sleeve.

6. A ground water heat transfer system as set forth in claim 1 wherein said insulating sleeve comprises an insulating plastic pipe.

7. A ground water heat transfer system as set forth in claim 1 wherein said insulating sleeve consist of an expanded rigid PVC.

8. A ground water heat transfer system as set forth in claim 1 wherein the surface of said insulating sleeve is very smooth to enhance laminar flow while the surface of said well is rough and promotes turbulent flow.

9. A ground water heat transfer system as set forth in claim 1 wherein the specific gravity of said insulating sleeve is approximately equal to the specific gravity of water.

10. A ground water heat transfer system as set forth in claim 1 wherein the specific gravity of said insulating sleeve is less than the specific gravity of water.

11. A ground water heat transfer system as set forth in claim 1 wherein said open return outlet from said water pump comprises a low resistance water path through a heat exchanger and said open return outlet terminates at the water level in said space between said insulating sleeve and the ground wall surface of said deep well to provide a minimum dynamic lift head.

12. A ground water heat transfer system as set forth in claim 1 which further includes a closed loop heat exchanger in the space between said insulating sleeve and said open wall surface below said water level, whereby water returned to said space flows past said closed loop heat exchanger before entering said insulating sleeve.

13. A ground water heat transfer system as set forth in claim 1 which further includes a safety screen in said insulating sleeve for maintaining said pump in the top of said well.

14. A ground water heat transfer system for a low cost high efficiency heat pump, comprising:
   a deep well having a wet open ground wall extending over the major portion of the well depth, a concentric insulating sleeve extending from the bottom of said deep well to a distance above the water level in the center of said deep well, a water pump suspended in said well having inlet means below said water level in said well, and having a return pipe connected to said water pump and having an open return outlet discharging in the space between said insulating sleeve and the ground wall surface of said well, and a closed loop heat exchanger in said space between said insulating sleeve and said open ground wall surface below said water level, whereby water returned to said space flows to the bottom of said well and into the bottom of said insulating sleeve whereby the dynamic lift head of said water pump is negligible.

15. A ground water heat transfer system as set forth in claim 14 wherein said heat exchanger comprises a hollow cylindrical shaped heat exchanger connected in said closed loop and immersed below the water in said well.

16. A ground water heat transfer system as set forth in claim 14 wherein said heat exchanger comprises a plurality of coaxial cylindrical cylinders.

17. A ground water heat transfer system as set in forth in claim 16 wherein said coaxial cylindrical cylinders comprise and outer·cylinder, and inner cylinder and a baffle cylinder connected therebetween.

* * * * *